US008339343B2

(12) United States Patent
Chang

(10) Patent No.: US 8,339,343 B2
(45) Date of Patent: Dec. 25, 2012

(54) LIQUID CRYSTAL DISPLAY DEVICE

(75) Inventor: Ching-Chao Chang, Taipei (TW)

(73) Assignee: Hannstar Display Corp., New Taipei (TW)

( * ) Notice: Subject to any disclaimer, the term of this patent is extended or adjusted under 35 U.S.C. 154(b) by 964 days.

(21) Appl. No.: 12/346,714

(22) Filed: Dec. 30, 2008

(65) Prior Publication Data
US 2010/0085497 A1 Apr. 8, 2010

(30) Foreign Application Priority Data

Oct. 3, 2008 (TW) ................................ 97138297 A

(51) Int. Cl.
*G09G 3/36* (2006.01)
(52) U.S. Cl. .............. 345/87; 345/88; 345/204; 349/33; 349/139
(58) Field of Classification Search .................. None
See application file for complete search history.

(56) References Cited

U.S. PATENT DOCUMENTS

| | | | |
|---|---|---|---|
| 8,098,220 B2* | 1/2012 | Chiang et al. ................... | 345/93 |
| 2007/0206141 A1* | 9/2007 | Lu et al. ......................... | 349/129 |
| 2008/0106658 A1* | 5/2008 | Wang et al. ..................... | 349/37 |
| 2009/0102773 A1* | 4/2009 | Um et al. ......................... | 345/92 |

* cited by examiner

*Primary Examiner* — Andrew L Sniezek
(74) *Attorney, Agent, or Firm* — Huffman Law Group, P.C.

(57) ABSTRACT

The present invention discloses a liquid crystal display (LCD) device. The LCD device comprises an upper substrate and a lower substrate. Every two data lines and two scan lines define two pixels. Each pixel comprises a pixel electrode and a transistor, and a biased electrode is arranged under a slot between two pixel electrodes of the two pixels. When positive frame, the voltage of the biased electrode, $V_E$, is greater than the voltage the pixel electrode, $V_P$; when negative frame, the voltage of the biased electrode, $V_E$, is smaller than the voltage the pixel electrode, $V_P$.

40 Claims, 7 Drawing Sheets

LIQUID CRYSTAL DISPLAY DEVICE

BACKGROUND OF THE INVENTION

1. Field of the Invention

The present invention relates to a liquid crystal display device, and more particularly, to a liquid crystal display device that comprises pixels having novel structures.

2. Description of the Prior Art

Many liquid crystal displays, such as Multi-domain vertical alignment type liquid crystal display, bear a high contrast ratio, fast response time, and a wide viewing angle by applying an electric field to reorient liquid crystal molecules in the displays.

FIG. 1 is a cross sectional view of a vertical alignment type liquid crystal display according to prior art. In order to alter alignment of liquid crystals 12, a pixel electrode 4 is formed on a lower substrate 2 and a plurality of protrusions 6 are formed at the pixel electrode 4. In addition, a common electrode 10 is formed below an upper substrate 14 and a plurality of protrusions 8 are formed below the common electrode 10. The structure mentioned above results in the liquid crystals 12 tilting a little bit due to the presence of the protrusions 6,8. When voltages are applied to the pixel electrode 4 and the common electrode 10, a transverse-electric field is generated as the dotted-line arrows to reorient liquid crystal molecules 12 in different angles and thus increase the transmittance.

FIG. 2 shows a cross sectional view of another vertical alignment type liquid crystal display according to prior art. The structure of which is similar to the structure shown in FIG. 1, the difference is that a plurality of openings 16 formed by an etching process to replace the protrusions 6. Also, when voltages are applied to the pixel electrode 4 and the common electrode 10, a transverse-electric field is generated as the dotted-line arrows to reorient liquid crystal molecules 12 in different angles and thus increase the transmittance.

In addition, the liquid crystal display comprises a plurality of scan lines and data lines constructing driving circuits, where the data lines are connected to the data drivers, and the scan lines are connected to the scan drivers. Because the resolution of the liquid crystal display is increased, the number of the scan lines and data lines will be inevitably increased, and the cost is also increased. For lowering the cost, the number of the data lines must be decreased.

FIG. 3 shows the structure of the pixels of a conventional liquid crystal display. For simplicity and convenience, only the lower substrate, the substrate for producing transistors thereon, a partial plan view of which is shown. As shown in FIG. 3, in each row of pixel electrode P0-P4, two pixel electrodes across the data line are driven by the same data line, and driven by two different scan lines individually. For example, data line S2 drives both of pixel electrode P1 and pixel electrode P2, scan line G1 drives pixel electrode P1 but scan line G2 drives pixel electrode P2; data line S3 drives both of pixel electrode P3 and pixel electrode P4, scan line G1 drives pixel electrode P3 but scan line G2 drives pixel electrode P4. The structure shown in FIG. 3 can decrease the number of data lines.

A Taiwan Patent, issued number 548615, entitled "Display device having three adjacent pixel electrodes driven by the same data line," disclose a display device having three adjacent pixel electrodes are selectively driven by the same data line via a first switch, a second switch, and a third switch. The number of data lines can be further decreased.

In each row of pixel electrodes, every two or three pixel electrodes are driven by the same data line as mentioned above has been applied in liquid crystal display devices such as the vertical alignment type as mentioned above. However, some difficulties are encountered. The major difficulty is the arrangement between two adjacent pixel electrodes. The arrangement must consider the fringe field and crosstalk between pixel electrodes. For generating larger pretilt angles, the fringe field should be large enough; for smaller crosstalk, the distance between two pixel electrodes should be increased. However, increasing the distance between two pixel electrodes will lower the aperture ratio. Besides, the fringe field is not large enough and the crosstalk is still troublesome.

Therefore, it would be advantageous to provide a novel liquid crystal display device having novel structure of pixels, especially for every two or three pixel electrodes driven by the same data line, to overcome the defects of the prior art.

SUMMARY OF THE INVENTION

An object of the present invention is to provide a liquid crystal display device that can increase the fringe field, reduce the crosstalk, enhance the aperture ratio, and reduce the response time.

According to the object, the present invention provides a liquid crystal display device, which comprises an upper substrate, and a lower substrate. Where the lower substrate comprises a plurality of data lines and a plurality of scan lines perpendicular to one another to construct an array of pixel, each two data lines and two scan lines define two pixels, each pixel comprises a pixel electrode and a transistor, and a biased electrode is arranged below a slot between the two pixel electrodes of the two pixels, and where the biased electrode has a voltage $V_E$, and the two pixel electrodes have a voltage $V_P$, when one or two of the two pixel are in the positive frame, $V_P > V_E$, when one or two of the two pixels are in the negative frame, $V_P < V_E$.

DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components. Wherever possible, the same or similar reference numbers are used in drawings and the description to refer to the same or like parts. It should be noted that any drawings presented are in simplified form and are not to precise scale. In reference to the disclosure herein, for purposes of convenience and clarity only, directional terms, such as, top, bottom, left, right, up, down, over, above, below, beneath, rear, and front, are used with respect to the accompanying drawing. Such directional terms should not be construed to limit the scope of the invention in any manner.

Figure 1:
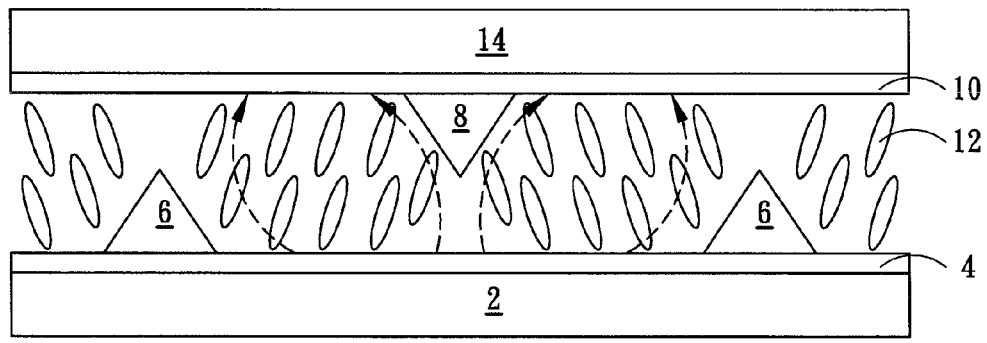
FIGS. 1-3 illustrate some conventional vertical-alignment type liquid crystal display device.
Figure 2:
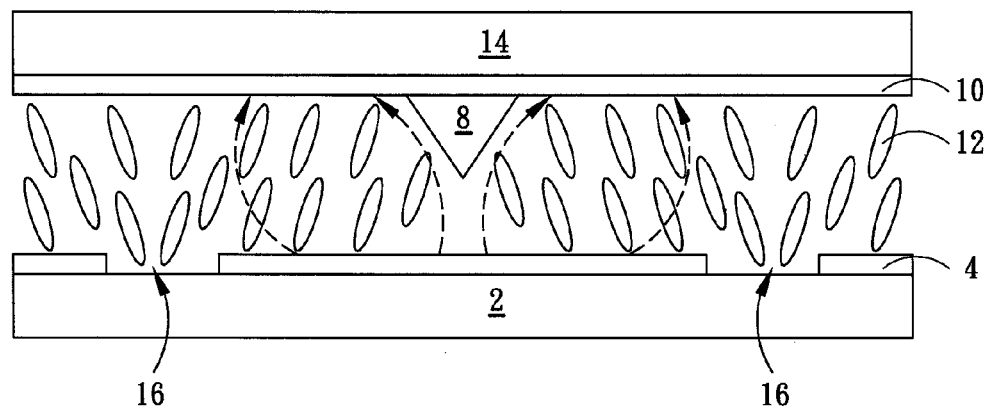
Figure 3:
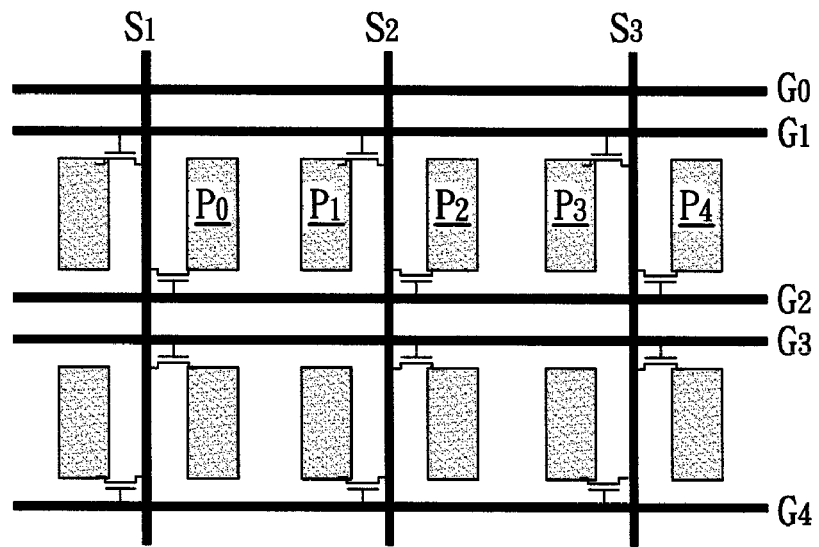
Figure 4:
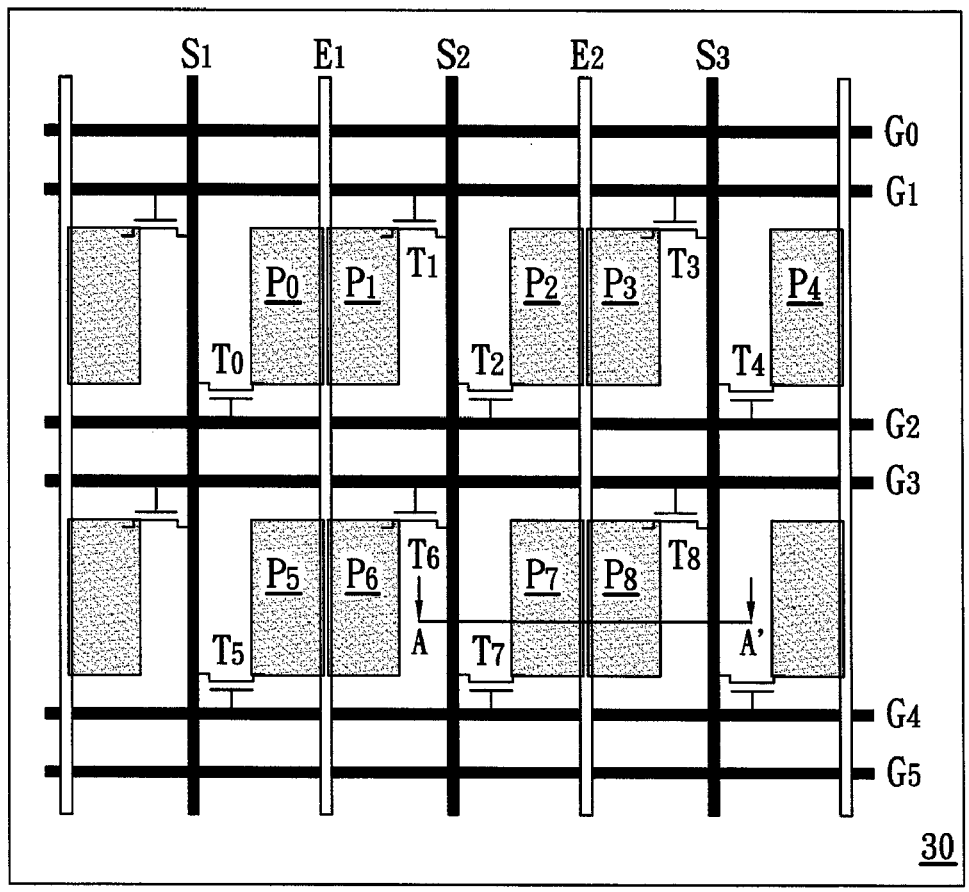
FIGS. 4-13 show embodiments of the vertical-alignment type liquid crystal display device according to the present invention.

FIG. 4 shows a structure of pixels of a vertical-alignment type liquid crystal display device according to one embodiment of the present invention. The structure of pixels comprises an upper substrate for producing color filters thereon and a lower substrate 30 for producing transistors thereon. For simplicity and convenience, FIG. 4 only shows a partial plan view of the lower substrate 30. The lower substrate 30 comprises a plurality of data lines such as S1-S3 and a plurality of scan lines G0-G5, which are perpendicular to one another. Each two data lines and two scan lines define two pixels. Each pixel comprises a pixel electrode such as P1-P8 and a transistor such as T0-T8. Each transistor comprises a gate, a source, and a drain, where the drain coupled to the pixel electrode, the gate coupled to a scan line, and the source coupled to a data line. In each row of pixel electrodes (P0-P4, P5-P8), every two of the pixel electrodes are driven by the same data line, and driven by two different scan lines. For example, data line S2 drives both of pixel electrode P1 and pixel electrode P2, scan line G1 drives pixel electrode P1 but scan line G2 drives pixel electrode P2; data line S3 drives both of pixel electrode P3 and pixel electrode P4, scan line G1 drives pixel electrode P3 but scan line G2 drives pixel electrode P4. In addition, a biased electrode (for example, E1-E2) is formed below a slot between the two pixel electrodes of two pixels defined by every two neighboring data lines and every two neighboring scan lines. The biased electrodes E1-E2 will be helpful to realize the object of the invention.

It is appreciated that the position of the transistors T0-T8 are not restricted according to the present invention. The position of the transistors T0-T8 may be changed to comply with various drive methods including row inversion, dot inversion, column inversion, frame inversion, and so forth. For example, the transistor T6 connected to data line S2 and scan line G3 may be changed to connect data line S2 and scan line G4; the transistor T5 connected to data line S1 and scan line G4 may be changed to connect data line S1 and scan line G3. Further, the biased electrodes E1-E2 may be applied to a vertical-alignment type liquid crystal display device that every three or more pixel electrodes are driven by the same data line in each row of pixel electrodes.

Figure 5:
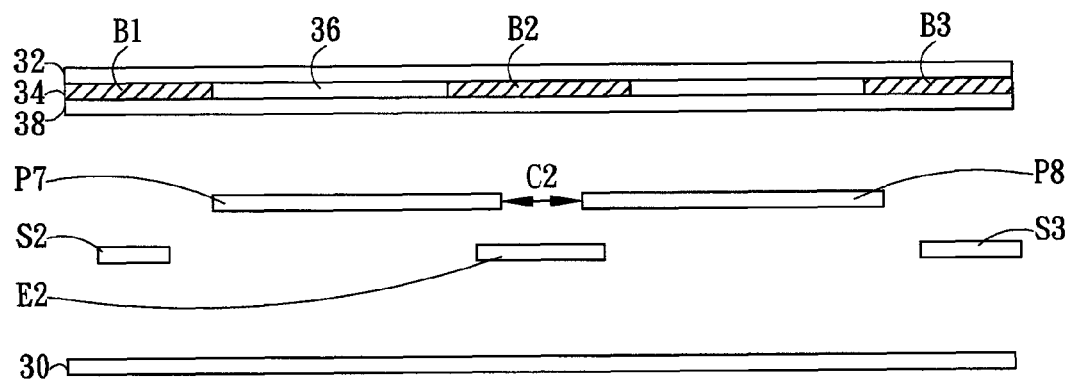

FIG. 5 is a cross sectional view taken along line A-A' in FIG. 4 according to one embodiment of the present invention; besides, this drawing further shows the detail of the upper substrate 32. A color filter 34 is formed below the upper substrate 32. The color filter 34 comprises a plurality of color resists 36 having different color constructing an array, and each two color resists 36 are separated by a black matrix B1-B3. A common electrode 38 is formed below the color filter 34. Each color resist orientates a pixel electrode P7-P8 of the lower substrate 30; each black matrix B1-B3 orientates a data line S2-S3 or a biased electrode E2. The biased electrode E2 is formed below a slot C2 between two pixel electrodes P7-P8.

Figure 6:
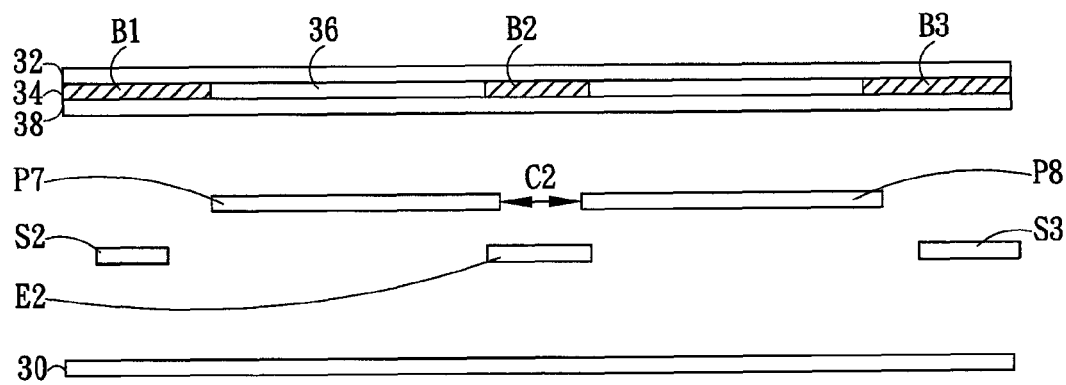

As shown in FIG. 5, the width of the biased electrode E2 is larger than the width of the slot C2, and the width of the black matrix B2 is larger than the width of the biased electrode E2. In other embodiments, the width of the biased electrode E2 may equal the width of the slot C2, and the width of the black matrix B2 may equal the width of the biased E2, the later circumstance having been shown in FIG. 6. FIG. 6 differs from FIG. 5 only in the width of the black matrix B2 and the biased electrode E2. Notice that the width of the black matrix B2 may be different from the width of the black matrix B1 or the black matrix B3. In addition, both of the biased electrode E2 and the data lines S2-S3 are formed at the same layer; that is, the biased electrode E2 and the data lines S2-S3 may be formed in the same procedure and formed by the same material. Further, some elements are not shown in this drawing for simplicity. These elements comprises a gate formed on the lower substrate 30, a insulating layer formed on the gate, a source, a drain, and a data line formed at the same layer on the insulating layer; a protecting layer formed on the source, drain, and data line; a liquid crystal layer formed between the upper substrate 32 and the lower substrate 30; and two alignment layer for aligning the liquid crystal layer respectively formed below the common electrode 38 and formed on the pixel electrodes P7-P8.

Figure 7:
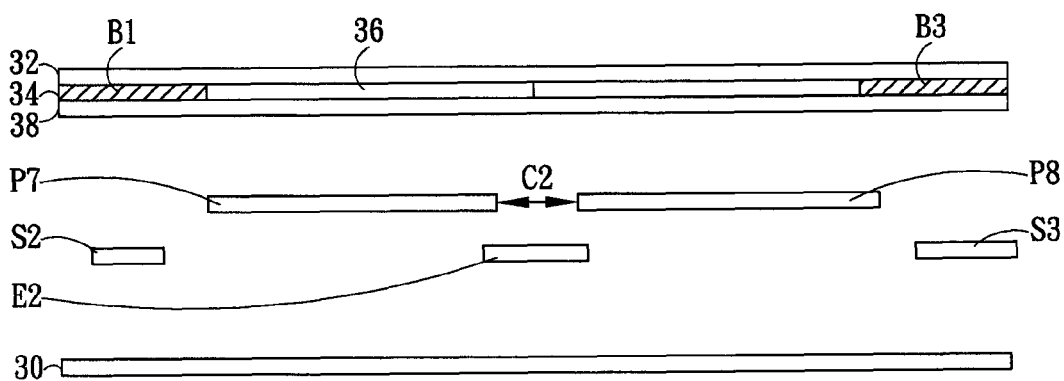

Because the biased electrode E2 also can shield light, the black matrix B2 is omitted in another embodiment, as shown in FIG. 7; there has no black matrix arranged above the biased electrode E2.

According to the present invention, a voltage $V_E$ is applied to the biased electrode E2 and the common electrode 38, and a voltage $V_P$ is applied to the pixel electrodes P7-P8. The experiment results show that the absolute value of $V_P$ should be greater than the absolute value of $V_E$ for enhancing the fringe field between the pixel electrodes P7-P8. That is, when positive frame voltage $V_P$ and $V_E$ is applied (when current pixel is in the positive frame), $V_P > V_E$, when negative frame voltage $V_P$ and $V_E$ is applied (when current pixel is in the negative frame), $V_P < V_E$.

Figure 8:
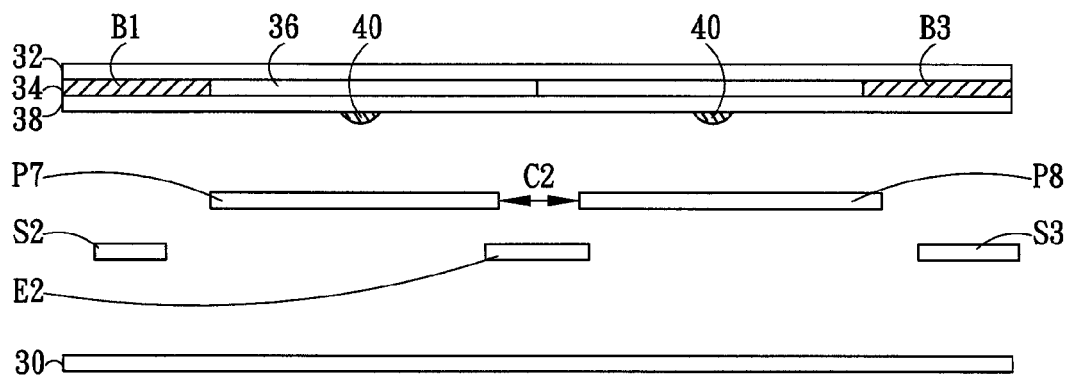
Figure 9:
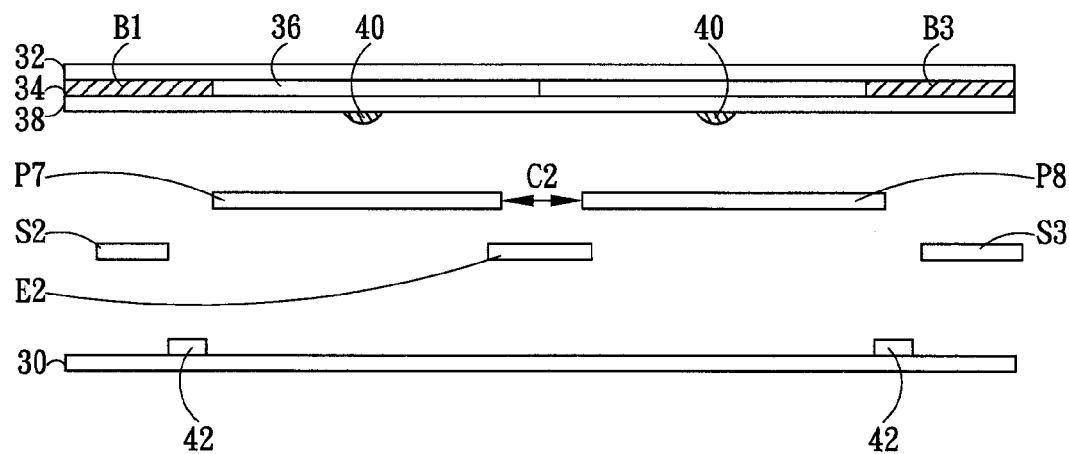

The key feature of the present invention comprises a biased electrode arranged below a slot between two pixel electrodes. Other features disclosed by the prior art may be added to the present invention to enhance the transverse-electric field of the vertical-alignment type liquid crystal display device. FIG. 8 shows another embodiment according to the present invention. FIG. 8 differs from FIG. 7 in that a plurality of protrusions 40 are formed below the common electrode 38 (or above the alignment layer) for increasing the pretilt angle of the liquid crystals. In other embodiments, the common electrode 38 may comprise a plurality of openings instead of the plurality of protrusions 40 shown in FIG. 8. Similarly, the pixel electrodes P7-P8 may comprise a plurality of protrusions or a plurality of openings for enhancing the transverse-electric field. FIG. 9 shows another embodiment according to the present invention. FIG. 9 differs from FIG. 8 in which a shielding electrode 42 is arranged below and arranged adjacent to the data lines S2-S3 for reducing the crosstalk between the pixel electrodes P7, P8 and the data lines S2, S3. The shielding electrode 42 and the scan lines may be formed at the same layer. Notice that the features disclosed in FIG. 8 and FIG. 9 may be applied to any embodiments of the present invention.

Figure 10:
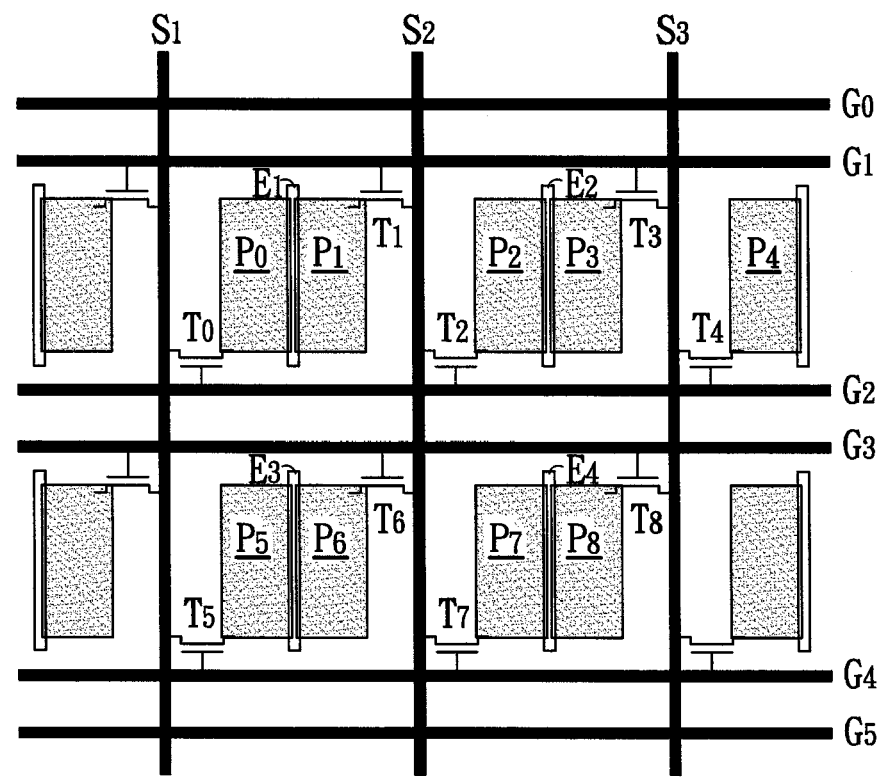

FIGS. 10-13 show some embodiments of the present invention, where the same or similar reference numbers are used in drawings and the description to refer to the same or like parts. Referring to FIG. 10, the length of the biased electrodes E1-E4 approximates the length of the slot between pixel electrodes P0-P8 and the biased electrodes E1-E4 is within each of the pixels. In this embodiment, the biased electrodes E1-E4, the scan lines G0-G5, and the gates are formed at the same layer and below the data lines S1-S3. For supplying voltages to the biased electrodes E1-E4, a latitudinal electrode (not shown) may cross the data lines S1-S3 and connects the biased electrodes (E1-E2 or E3-E4).

Figure 11:
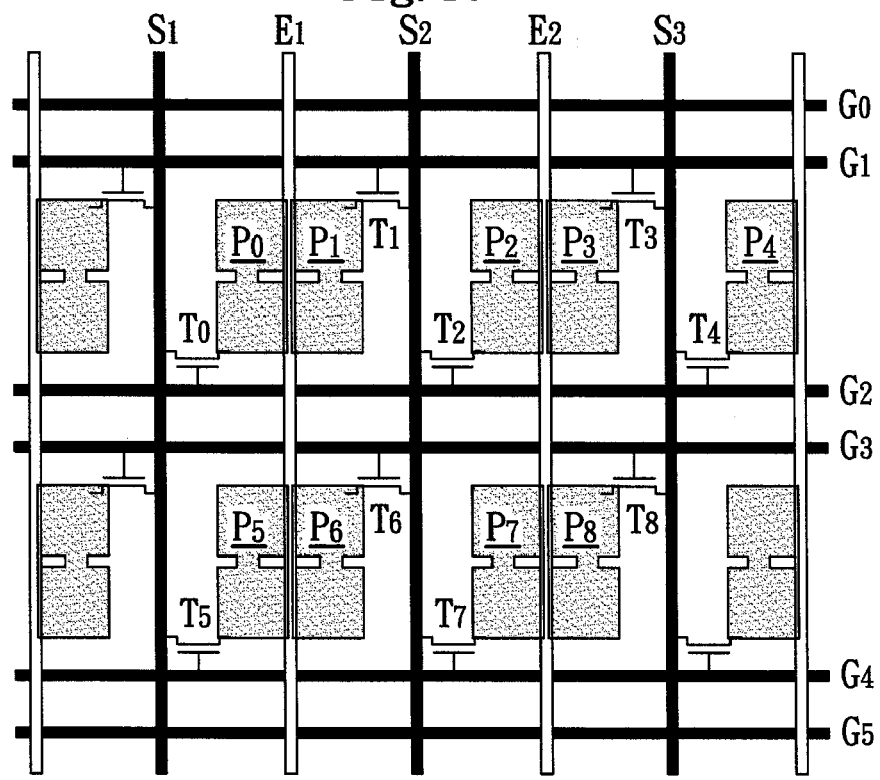

Referring to FIG. 11, the biased electrodes E1-E2 and the data lines S1-S3 are formed at the same layer. In addition, the biased electrodes E1-E2 are extended to cross the scan lines G0-G5. Further, each pixel electrode P0-P8 comprise a plurality of openings for enhancing the transverse-electric field. Notice that the number, shape, and position of the opening are not restricted.

Figure 12:
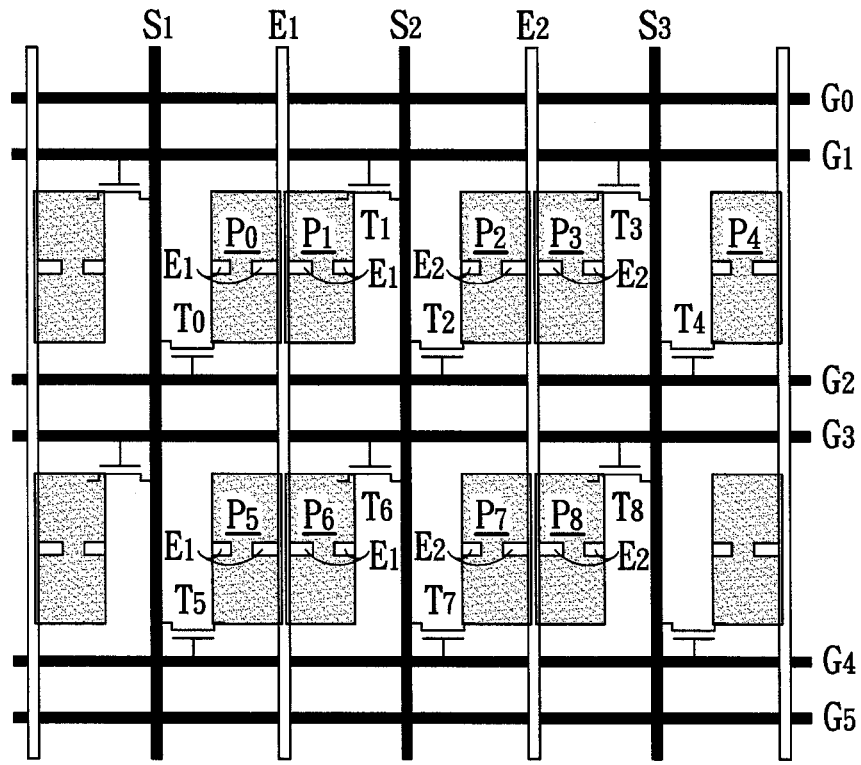

Referring to FIG. 12, the biased electrodes E1-E2 and the data lines S1-S3 are formed at the same layer. In addition, the biased electrodes E1-E2 are extended to cross the scan lines G0-G5. Further, each pixel electrode P0-P8 comprises a plurality of openings, and the biased electrodes E1-E2 are branched to extend below the plurality of openings for enhancing the transverse-electric field and reducing the response time.

Figure 13:
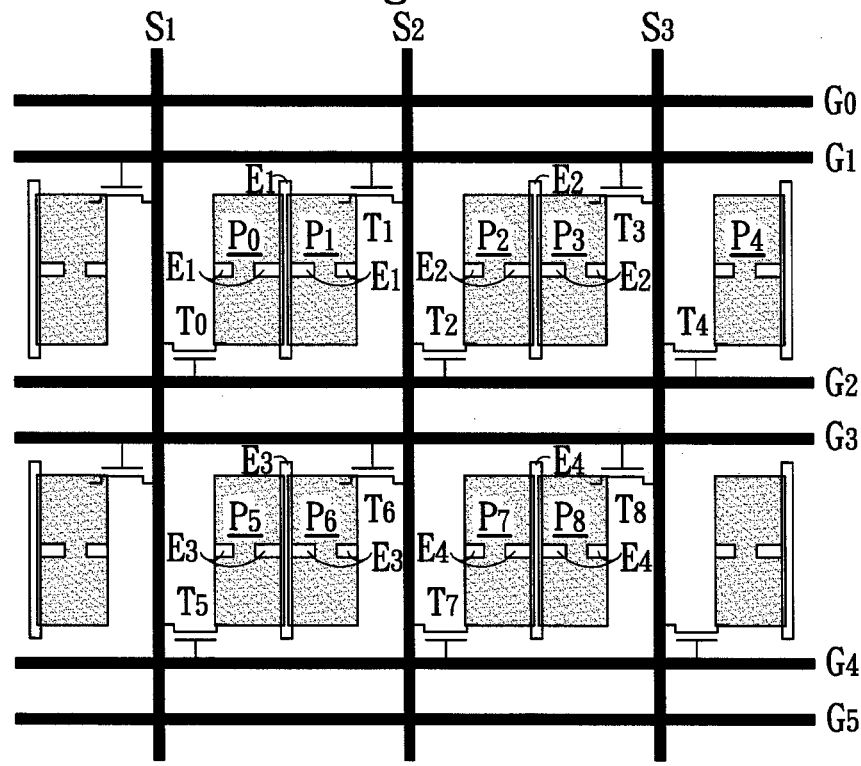

Referring to FIG. 13, the length of the biased electrodes E1-E4 approximates the length of the slot between pixel electrodes P0-P8 and the biased electrodes E1-E4 is within each of the pixels. In this embodiment, the biased electrodes E1-E4, the scan lines G0-G5, and the gate (not shown) are formed at the same layer and below the data lines S1-S3. For supplying voltages to the biased electrodes E1-E4, a latitudinal electrode (not shown) may cross the data lines S1-S3 and connects the biased electrodes (E1-E2 or E3-E4). In addition, each pixel electrode P0-P8 comprises a plurality of openings, and the biased electrodes E1-E4 are branched to extend below the plurality of openings for enhancing the transverse-electric field and reducing the response time.

Figure 14:
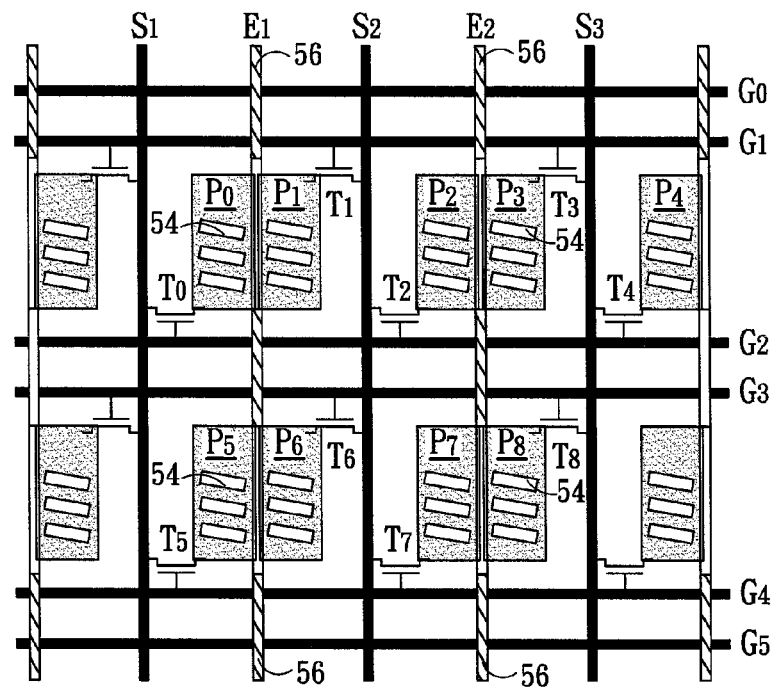
FIGS. 14-15 show an embodiment of the Fringe Field Switching (FFS) type liquid crystal display device according to the present invention.
Figure 15:
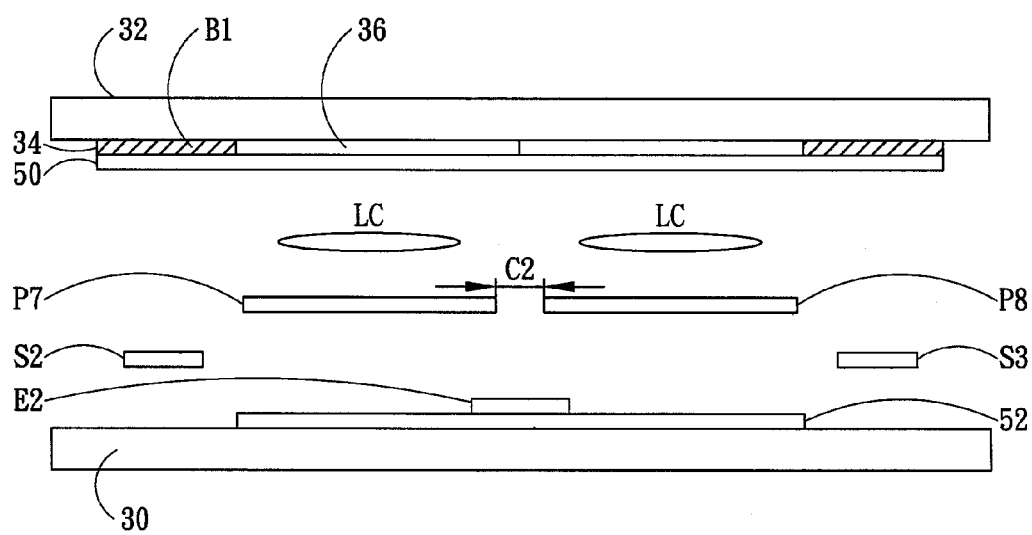

The inventive concept of the present invention not only can be applied to vertical-alignment type LCD device, but also can be applied to other types of LCD device. FIGS. 14-15 show an exemplary embodiment of a Fringe Field Switching (FFS) type liquid crystal display device according to the present invention.

The embodiment and its variance of the FFS type LCD device are similar to the embodiments of the vertical-alignment type LCD device described above. For simplicity, the same or similar reference numbers are used to refer to the same or like parts, and the description of which are omitted.

The major difference between the FFS type and the vertical-alignment type LCD device is an array common 52, made of a material same as the pixel electrodes P0-P8, is formed between the biased electrode E2 and the lower substrate 30 instead of being formed below the color filter 34 of the upper substrate 32. The region that the array common 52 covered may be larger than or approximate to the region pixel electrodes P7-P8 covered. In addition, a color filter over coat 50 may be formed below the color filter 34 to protect it. In addition, the biased electrode E2 and the scan lines G0-G5 are formed in the same layer but they are electrically insulated to each other. Because the biased electrode E2 may be extended to cross the scan lines G0-G5, a bridge 56 is formed over the scan lines G0-G5 at the crossing region between the biased electrode E2 and the scan lines G0-G5. The bridge 56 and the date lines S1-S3 may be formed at the same layer. A contact hole (not shown) and an electrode (not shown) over the contact hole may be formed later to establish electrical connection between the biased electrode E2 and the bridge 56. The pixel electrodes P0-P8 and the electrode that connects the biased electrode E2 and the bridge 56 may be formed at the same layer. The bridge 56 straddles the scan lines G0-G5 such that the biased electrode E2 and the scan lines G0-G5 can be electrically insulated with each other.

Notice that a different shape of a plurality of openings 54 may be formed within each pixel electrode P0-P8, and the number, shape, and position of the opening 54 may be same as the embodiments illustrated before.

The biased electrode E2 has a voltage $V_E$, the array common 52 has a voltage $V_C$, and the pixel electrodes S2-S3 have a voltage $V_P$, where $V_E$ equals $V_C$, when $V_P$ and $V_E$ are in the positive frame, $V_P>V_E$, when $V_P$ and $V_E$ are in the negative frame, $V_P<V_E$.

The FFS type LCD device of the present invention has the following advantages: (1) the structure is configured to no extra common lines are needed; (2) the array common can be used for electrical shielding and the biased electrode can be used for black matrix; (3) the FFS type LCD device of the present invention has an excellent aperture ratio comparing to other LCD modes.

According to the present invention, the distance between the two pixel electrodes can be reduced because the biased electrode will provide excellent shielding effect to lower the crosstalk between the two pixel electrodes. In the prior arts, the width of the slot between two adjacent pixel electrodes is about 8 to 10 μm. According to the present invention, the width of the slot between two adjacent pixel electrodes is about 4 to 8 μm. In one embodiment of the present invention, the width of the slot between two adjacent pixel electrodes is 6 μm. In addition, because the voltage of the pixel electrode $V_P$ is greater than the voltage of the biased electrode $V_E$, the fringe field between two adjacent pixel electrodes is increased on condition that the original direction of the electric field within the pixel has not been altered. Therefore the response time can be reduced and other related defects such as the touch mura can be improved as well. Moreover, because the distance between two adjacent pixel electrodes is reduced, the area of the black matrix oriented toward the slot between the two adjacent pixel electrodes can be reduced, thus enhancing the aperture ratio.

Although specific embodiments have been illustrated and described, it will be appreciated by those skilled in the art that various modifications may be made without departing from the scope of the present invention, which is intended to be limited solely by the appended claims.

What is claimed is:

1. A liquid crystal display device, comprising:
an upper substrate; and
a lower substrate comprising a plurality of data lines and a plurality of scan lines perpendicular to one another to construct an array of pixel, wherein each two data lines and two scan lines define two pixels with each pixel comprising a pixel electrode and a transistor, and a biased electrode is arranged below a slot between a border of the two pixel electrodes of the two pixels;
and wherein said biased electrode has a voltage $V_E$, and the two pixel electrodes have voltages $V_P$, when one or two of the two pixels are in the positive frame, $V_P>V_E$, when one or two of the two pixels are in the negative frame, $V_P<V_E$;
and wherein said transistor comprises a gate connected to one scan line, a source connected to one data line, and a drain connected to said pixel electrode, and said upper substrate comprises a common electrode having a voltage $V_C$ that equals $V_E$.

2. The device as recited in claim 1, wherein the position of said transistor is changed to comply with various drive methods including row inversion, dot inversion, column inversion, frame inversion, and so forth.

3. The device as recited in claim 1, wherein said upper substrate further comprises a color filter formed below said upper substrate, said color filter comprises a plurality of color resists having different colors to construct an array, each two color resists are separated by a black matrix, said common electrode is formed below said color filter, each color resist orientates toward a pixel electrode of said lower substrate, and each black matrix orientates toward one data line or said biased electrode.

4. The device as recited in claim 3, wherein each black matrix orientates toward one data line, and there is no black matrix arranged above said biased electrode.

5. The device as recited in claim 3, wherein the width of said biased electrode is equal to or larger than the width of the slot between the two pixel electrodes, and the width of the black matrix that orients toward said biased electrode is equal to or larger than the width of said biased electrode.

6. The device as recited in claim 1, wherein said common electrode further comprises a plurality of protrusions formed below said common electrode for increasing the pretilt angle of the liquid crystals.

7. The device as recited in claim 1, wherein each pixel electrode comprises a plurality of protrusions or a plurality of openings for increasing the pretilt angle of the liquid crystals.

8. The device as recited in claim 1, wherein said biased electrode and the scan lines are formed at the same layer, the length of said biased electrode approximates the length of the slot, said biased electrode is within the pixel, and a latitudinal electrode crosses the data lines and connects said biased electrode.

9. The device as recited in claim 1, wherein each pixel electrode comprises a plurality of openings.

10. The device as recited in claim 9, wherein said biased electrode is branched to extend below the plurality of openings.

11. The device as recited in claim 1, wherein said biased electrode and the data lines are formed at the same layer, said biased electrodes are extended to cross the scan lines, and each pixel electrode comprises a plurality of openings.

12. The device as recited in claim 11, wherein said biased electrode is branched to extend below the plurality of openings.

13. The device as recited in claim 1, further comprising a shielding electrode arranged below and arranged adjacent to the data lines, the shielding electrode and the scan lines being formed at the same layer.

14. The device as recited in claim 1, wherein the width of said slot between the two pixel electrodes is about 4 to 8 μm.

15. The device as recited in claim 14, wherein the width of said slot between the two pixel electrodes is 6 μm.

16. The device as recited in claim 1, further comprising an array common arranged between said biased electrode and said lower substrate, and said array common has a voltage $V_C$ equal to the voltage VE.

17. The device as recited in claim 16, wherein each pixel electrode comprises a plurality of openings.

18. A liquid crystal display device, comprising:
an upper substrate, said upper substrate comprising a color filter below said upper substrate, the color filter comprises a plurality of color resists having different colors to construct an array, each two color resists are separated by a black matrix, and a common electrode formed below the color filter;
a lower substrate comprising a plurality of data lines and a plurality of scan lines perpendicular to one another to construct an array of pixel, wherein each two data lines and two scan lines define two pixels with each pixel comprising a pixel electrode and a transistor and one pixel electrode being orientated toward one color resist, and a biased electrode is arranged below and parallel to a slot, which is parallel to the data lines and is arranged between a border of the two pixel electrodes of the two pixels and electrically disconnects the two pixel electrodes of the two pixels; and
a liquid crystal layer is arranged between said upper substrate and lower substrate;
wherein said biased electrode has a voltage $V_E$, the common electrode has a voltage $V_C$, and the two pixel electrodes have a voltages $V_P$, $V_E$ equals $V_C$, and when one or two of the two pixels are in the positive frame, $V_P > V_E$, when one or two of the two pixels are in the negative frame, $V_P < V_E$.

19. The device as recited in claim 18, wherein said transistor comprises a gate, a source, and a drain, said drain connected to the pixel electrode, said gate connected to one scan line, and said source connected to one data line.

20. The device as recited in claim 19, wherein the position of said transistor is changed to comply with various drive methods including row inversion, dot inversion, column inversion, frame inversion, and so forth.

21. The device as recited in claim 18, wherein there is no black matrix arranged above said biased electrode.

22. The device as recited in claim 18, wherein the width of said biased electrode is equal to or larger than the width of the slot between the two pixel electrodes.

23. The device as recited in claim 18, wherein the common electrode further comprises a plurality of protrusions or a plurality of openings formed below the common electrode for increasing the pretilt angle of the liquid crystals.

24. The device as recited in claim 18, wherein each pixel electrode comprises a plurality of protrusions or a plurality of openings for increasing the pretilt angle of the liquid crystals.

25. The device as recited in claim 18, wherein said biased electrode and the scan lines are formed at the same layer, the length of said biased electrode approximates the length of the slot, said biased electrode is within the pixel, and a latitudinal electrode crosses the data lines and connects said biased electrodes.

26. The device as recited in claim 25, wherein each pixel electrode comprises a plurality of openings, and said biased electrode is branched to extend below the plurality of openings.

27. The device as recited in claim 18, wherein said biased electrode and the data lines are formed at the same layer, said biased electrodes are extended to cross the scan lines, and each pixel electrode comprises a plurality of openings.

28. The device as recited in claim 27, wherein said biased electrode is branched to extend below the plurality of openings.

29. The device as recited in claim 18, further comprising a shielding electrode arranged below and arranged adjacent to the data lines, the shielding electrode and the scan lines being formed at the same layer.

30. The device as recited in claim 18, wherein the width of said slot between the two pixel electrodes is about 4 to 8 μm.

31. The device as recited in claim 30, wherein the width of said slot between the two pixel electrodes is 6 μm.

32. A liquid crystal display device, comprising:
an upper substrate, said upper substrate comprising a color filter below said upper substrate, the color filter comprises a plurality of color resists having different colors to construct an array, each two color resists are separated by a black matrix, and a color filter over coat formed below the color filter;
a lower substrate comprising a plurality of data lines and a plurality of scan lines perpendicular to one another to construct an array of pixel, wherein each two data lines and two scan lines define two pixels with each pixel comprising a pixel electrode and a transistor and one pixel electrode being orientated toward one color resist, a biased electrode is arranged below and parallel to a slot that is parallel to the data lines and is arranged between a border of the two pixel electrodes of the two pixels and electrically disconnects the two pixel electrodes of the two pixels, and an array common is arranged between the biased electrode and the lower substrate; and a liquid crystal layer is arranged between said upper substrate and lower substrate;

wherein said biased electrode has a voltage $V_E$, the array common has a voltage $V_C$, and the two pixel electrodes have voltages $V_P$, $V_E$ equals $V_C$, and when one or two of the two pixels are in the positive frame, $V_P > V_E$, when one or two of the two pixels are in the negative frame, $V_P < V_E$.

33. The device as recited in claim 32, wherein the transistor comprises a gate, a source, and a drain, said drain connected to the pixel electrode, said gate connected to one scan line, and said source connected to one data line.

34. The device as recited in claim 33, wherein the position of said transistor is changed to comply with various drive methods including row inversion, dot inversion, column inversion, frame inversion, and so forth.

35. The device as recited in claim 32, wherein there is no black matrix arranged above said biased electrode.

36. The device as recited in claim 32, wherein the width of said biased electrode is equal to or larger than the width of the slot between the two pixel electrodes.

37. The device as recited in claim 32, wherein each pixel electrode comprises a plurality of openings for increasing the pretilt angle of the liquid crystals.

38. The device as recited in claim 32, wherein said biased electrode and the scan lines are formed at the same layer, said biased electrodes are extended to cross the scan lines, a bridge is formed over the scan lines at the crossing region between said biased electrode and said scan lines, said bridge and said date lines are formed at the same layer, a contact hole and an electrode over the contact hole are formed to establish electrical connection between said biased electrode and said bridge.

39. The device as recited in claim 32, wherein the width of said slot between the two pixel electrodes is about 4 to 8 μm.

40. The device as recited in claim 39, wherein the width of said slot between the two pixel electrodes is 6 μm.

* * * * *